Oct. 31, 1961   J. STEPHENS   3,006,667
PACKINGS FOR ROTARY SHAFTS AND THE LIKE
Original Filed May 17, 1955   6 Sheets-Sheet 1

Inventor
JAMES STEPHENS
By
Mead, Browne, Schuyler Beveridge
Attorneys

Oct. 31, 1961             J. STEPHENS             3,006,667

PACKINGS FOR ROTARY SHAFTS AND THE LIKE

Original Filed May 17, 1955             6 Sheets-Sheet 2

Inventor
JAMES STEPHENS
By
Mead, Browne, Schuyler & Beveridge
Attorneys

Fig. 4.

Oct. 31, 1961 J. STEPHENS 3,006,667
PACKINGS FOR ROTARY SHAFTS AND THE LIKE
Original Filed May 17, 1955 6 Sheets-Sheet 4

Inventor
JAMES STEPHENS
By
Mead, Browne, Schuyler & Beveridge
Attorneys

12

United States Patent Office 3,006,667
Patented Oct. 31, 1961

3,006,667
PACKINGS FOR ROTARY SHAFTS AND THE LIKE
James Stephens, Bradford, England, assignor to United States Metallic Packing Company Limited, Bradford, Yorkshire, England, a British company
Continuation of application Ser. No. 509,036, May 17, 1955. This application June 4, 1959, Ser. No. 818,116
Claims priority, application Great Britain Apr. 25, 1952
10 Claims. (Cl. 286—11.15)

The present invention relates to packings for rotatable members such as shafts, sleeves and the like, and this application is a continuation of my pending application Serial No. 509,036, filed May 17, 1955, now abandoned, which, in turn, is a continuation-in-part of my application Serial No. 349,614, filed April 20, 1953, now abandoned.

It is an important object of the present invention to provide a packing of relatively long life in that the wear of the sealing faces will be relatively light so that the sealing faces will be capable of furnishing a satisfactory seal over a relatively long period of operation.

It is a further object of the present invention to provide a packing in which the pressure between the sealing faces will never be greatly in excess of that actually required to maintain a seal under the prevailing conditions of service.

It is a further object of the invention to provide a packing in which the spring pressure applied to keep the sealing faces in contact with one another is relatively small in comparison with the maximum pressure difference across the packing that is likely to be encountered.

It is a further object of the invention to provide a packing in which the maintenance of the sealing faces in engagement with one another is at least assisted by the fluid pressure on one side of the packing or by the pressure difference across the packing and it is furthermore an object of the invention to provide a packing in which such assistance is enjoyed irrespective of the direction of the presssure difference across the packing or, in other words, irrespective of whether the packing is operating under pressure or under vacuum.

A still further object of the present invention is a packing having a self-balancing effect whereby the sealing faces are urged into sealing engagement by a force which varies with variation of the fluid pressures to be sealed against, but never greatly exceeds the minimum force necessary to maintain a seal at any particular value of pressure difference across the packing.

A principal feature of the present invention resides in a packing for a rotatable member such as a shaft, sleeve or the like which comprises a rotatable packing ring, a resilient sealing ring to provide a seal between the rotatable packing ring and the rotatable member, a non-rotatable packing ring adapted to be arranged on one side of the rotatable packing ring and in face to face sealing engagement therewith, a clamping ring adapted to be arranged on the opposite side of the rotatable packing ring and to be fixedly mounted on the rotatable member and spring means for urging said non-rotatable packing ring and said rotatable packing ring into face to face engagement with one another, at least one of the three first mentioned rings being axially displaceable under the influence of the fluid presssures at opposite sides of the packing thus enabling the fluid pressure at one side of the packing or the fluid pressure at the other side of the packing to at least assist in holding said rotatable and non-rotatable packing rings in sealing engagement with one another irrespective of the direction of the pressure difference across the packing.

In one form of packing the resilient sealing ring is located in an annular recess or counter bore formed in the rotatable packing ring and the resilient sealing ring alone is axially displaceable under the influence of the fluid pressures at opposite sides of the packing. In another arrangement the non-rotatable and rotatable packing rings are sealed respectively by resilient sealing rings against a stuffing box and against the rotatable member and are both axially displaceable under the influence of the pressures at opposite sides of the packing.

It will thus be apparent that an important feature of this invention resides in the axial displaceability under the influence of the fluid pressures at opposite sides of the packing of either a resilient sealing ring which seals the rotatable packing ring against the rotatable member or of the non-rotatable packing ring and the rotatable packing ring and that this feature not only gives rise to fluid pressure assistance in the maintenance of the sealing faces in sealing engagement with one another but also enables this assistance to be enjoyed irrespective of the direction of the pressure difference across the packing.

The term "effective crosss-sectional area" as used throughout this specification with reference to axially displaceable sealing and packing rings is intended to refer to the net unbalanced area subjected to the fluid pressure prevailing at one side or at the other side of the packing.

Other objects and features of the present invention will appear more fully below from the following detailed description considered in connection with the accompanying drawings which disclose several embodiments of the invention. It is to be expresssly understood, however, that the drawings are designed for purposes of illustration only and not as a definition of the limits of the invention, reference for the latter purpose being had to the appended claims.

Figure 1:
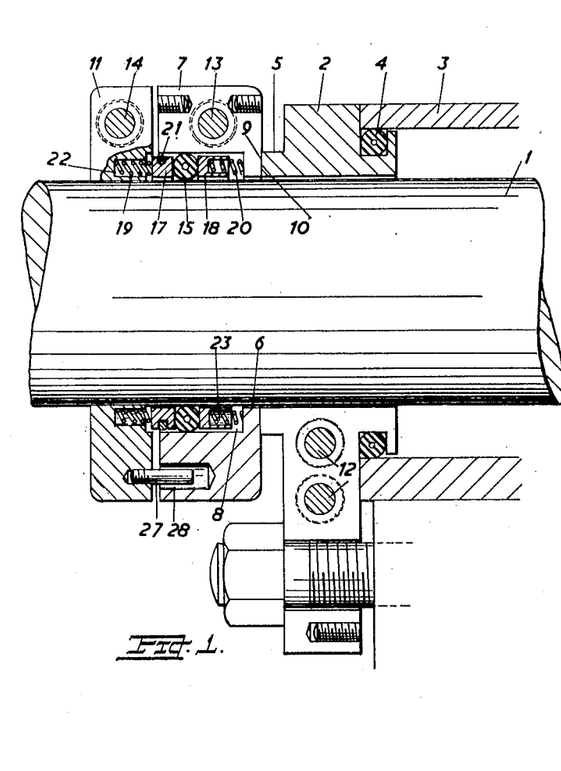
FIG. 1 is a sectional view of one form of packing, in which the upper part is taken in one axial plane and the lower part in a different axial plane.

In the arrangement shown in FIG. 1 the shaft 1 passes through a cover 2 of a casing 3. The cover 2, which may be regarded as a non-rotatable packing ring, is sealed against the casing 3 by means of a sealing ring 4. An extension ring 5 projecting axially from the cover 2 extends around an opening in the cover 2 through which the shaft 1 passes and which is of greater diameter than the shaft 1 so as to provide a clearance therebetween.

The rotatable packing ring 7 is formed as a cup with a central opening 6 at its righthand end and with an internal counterbore or annular recess 8 extending inwardly up to the opening 6 from its lefthand end. At its righthand end the ring 7 is formed with an annular sealing face 9 which is in face to face contact with a sealing face 10 on the extension ring 5. The righthand or inner end of the counterbore or annular recess 8 has an end wall 8a and communicates with the interior of the casing 3 through the opening 6.

The clamping ring 11 is fixedly mounted on the shaft 1 to the left of the rotatable packing ring 7.

The rotatable packing ring 7 is formed in two halves the end faces of which meet in a more or less diametral plane and are secured together in sealing engagement with one another by bolts 13 on opposite sides thereof. The cover 2 is likewise formed in two halves the end faces of which meet in a more or less diametral plane and are held in sealing engagement with one another by bolts 12 on opposite sides of the shaft 1.

The clamping ring 11 is also formed in two halves secured together by bolts 14 on opposite sides thereof but with their faces slightly spaced apart so as to enable the clamping ring 11 to be firmly clamped on the shaft 1.

By forming the rings 7 and 11 and the cover 2 in halves the packing can be dismantled without passing the rings over the end of the shaft 1 but the invention includes packings in which the rings 7, 11 and cover 2 are each formed in one piece.

A resilient sealing ring 15 is axially displaceable in the counterbore 8 and provides a seal between the rotatable packing ring 7 and the shaft 1. The ring 15 is made of rubber or the like material and is of tubular form. The resilient sealing ring 15 is such that although it is capable of providing a seal between the ring 7 and the shaft 1 it can nevertheless be axially displaced in the counterbore 8 without undue frictional resistance.

Follower rings 17, 18 are provided on opposite sides of the resilient sealing ring 15 and sets of circumferentially spaced springs 19, 20 are arranged respectively between the follower ring 17 and the clamping ring 11 and between the follower ring 18 and the inner end of the counterbore 8.

The follower ring 17 is formed in two parts which are held together by a garter spring 21. The springs 19 are located and housed or largely housed in axial recesses 22 in the clamping ring 11.

The follower ring 18 is formed with axial recesses 23 therein to receive and locate the respective springs 20 and although shown as a solid ring is preferably formed in two parts held together by a garter spring.

In the packing of FIG. 1 the fluid pressures on opposite sides of the packing, that is to say the pressure within the casing 3 and in the region of the clamping ring 11, act on opposite sides of the resilient sealing ring 15. Thus a positive pressure within the casing 3 will press the resilient sealing ring 15 to the left and when a given degree of positive pressure is reached the springs 20 will become fully extended and will become ineffective so that neither the springs 19 or 20 will then be effective towards holding the sealing face 9 in engagement with the sealing face 10 and the seal will be maintained solely by the positive fluid pressure within the packing.

The packing of FIG. 1 is primarily intended for use under conditions when the external fluid pressure in the region of the clamping ring 11 is atmospheric so that increasing positive pressure within the packing will give rise to an increasing force applied to the rotatable packing ring 7 to keep its sealing face 9 in engagement with the sealing face 10. Since an increase of positive fluid pressure within the packing may demand an increased resistance to leakage across the sealing faces 9, 10 it may be said that the force applied to the packing ring 7 to maintain the seal will automatically vary more or less in proportion to the demand upon the packing. Insofar as an increasing demand for resistance to leakage may be taken to imply that the increasing internal positive pressure gives rise to some force tending to move the sealing faces 9, 10 apart, the packing of FIG. 1 may be regarded as to some extent balanced or self-balancing since the applied force tending to hold the faces 9, 10 in sealing engagement rises with an increasing force in the opposite direction. The existence of this self-balancing effect seems to be confirmed by practical experience in the use of packings substantially as shown in FIG. 1 under conditions when the external pressure is atmospheric.

When the external fluid pressure is atmospheric and when the fluid pressure within the packing is less than atmospheric the pressure acting on surface 15a of sealing ring 15 causes the resilient sealing ring 15 to move to the right whereby to compress the springs 20 and when the vacuum reaches a given value to allow the springs 19 to become fully extended and therefore ineffective. Thus when the packing is under a vacuum the reduction in pressure in the counterbore 8 will be largely compensated by the increased pressure of the springs 20 resulting from the displacement of the resilient sealing ring 15 to the right.

Figure 2:
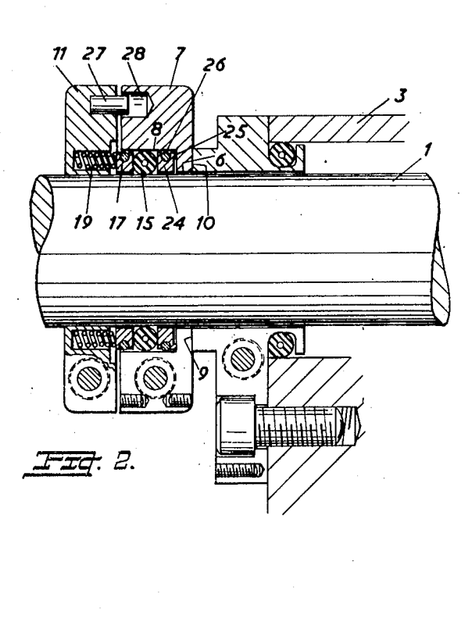
FIG. 2 is a view similar to FIG. 1 illustrating a second form of packing.

FIG. 2 illustrates a packing similar to that of FIG. 1 except that the axial length of the rotatable packing ring 7 is less than that of FIG. 1 and instead of providing a set of springs 20 on the righthand side of the resilient packing ring, 15 a stepped spacing ring 24 is arranged between the resilient sealing ring 15 and the inner end of the counterbore 8. It will be noted that the spacing ring 24 is stepped on that side thereof adjacent to the end face of the counterbore 8 and that the step 25 is located around the outer part of the ring 24 so that the remainder of the righthand face of the ring 24 is spaced from the end face of the counterbore whereby pressure from the casing 3 can pass through the opening 6 at the end of the rotatable packing ring 7 to the space between the ring 24 and the end face of the counterbore 8. Moreover the diameter of the ring 24 is greater than the diameter of the shaft 1 so that pressure from the casing 3 can be transmitted to the resilient sealing ring 15. The spacing ring 24 is formed in two halves which are held together by a garter spring 26 and pressure from the casing 3 can be transmitted between the ends of the halves of the ring 24 to the space between the external periphery of the ring 24 and the circumferential surface of the counterbore 8.

In the arrangements of both FIGS. 1 and 2 axially directed pins 27 on the clamping ring extend into axial recesses 28 in the rotatable packing ring 7 to provide a positive drive from the clamping ring 11 to the rotatable packing ring 7.

The action of the packing shown in FIG. 2 under positive and negative fluid pressure is substantially similar to that of the packing in FIG. 1. Under positive pressure the ring 15 will move to the left and when the follower ring 24 moves out of engagement with the rotatable packing ring 7 the springs 19 will to all intents and purposes become ineffective in that they will exert no pressure on the rotatable packing ring 7 to keep its sealing face 9 in engagement with the sealing face 10. When a vacuum exists within the counterbore 8 the tendency for the resilient sealing ring 15 to move to the right will assist the springs 19 to maintain the seal and will therefore largely compensate for the reduction of pressure on the righthand end of the counterbore. In this arrangement the springs 19 remain effective under conditions of vacuum but become ineffective under conditions of positive pressure within the counterbore 8.

Figure 3:
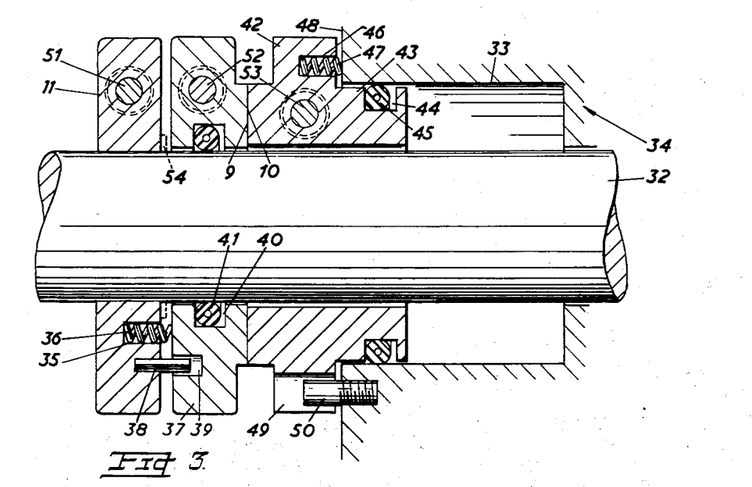
FIG. 3 is a view similar to FIG. 1 illustrating one form of stuffing box packing.

FIG. 3 illustrates a packing according to the present invention suitable for use in connection with a rotatable shaft 32 and a stuffing box 33 on a piece of equipment such for example as a rotary pump indicated by the reference numeral 34. In this arrangement a clamping ring 11 is clamped on the shaft 32 and has a series of axially directed pockets 35 to receive springs 36 which abut against a rotatable packing ring 37. The pockets 35 are equally spaced circumferentially around the ring 11. The clamping ring 11 also has a number of circumferentially equally spaced driving pins 38 projecting axially therefrom and entering into similarly spaced recesses 39 in the face of the rotatable packing ring 37 whereby to drive the ring 37 with the shaft 32. The rotatable packing ring 37 has a radially inwardly open annular recess 40 in which is received a resilient sealing ring 41 for sealing the rotatable packing ring 37 against the shaft 32. The sealing ring 41 is preferably formed of rubber or the like material and of tubular form.

The rotatable packing ring 37 has a sealing face 9 at its righthand end adapted sealingly to engage a corresponding sealing face 10 at the lefthand end of a non-rotatable packing ring 42 the righthand portion 43 of which is of suitable diameter to enter into the stuffing box 33 has an end surface 43a and is formed with a radially outwardly open annular recess 44 in which is received a resilient sealing ring 45 to seal the non-rotatable packing ring 42 against the wall of the stuffing box. The resilient sealing ring 45 is preferably similar to the ring 41.

The non-rotatable packing ring 42 has in its righthand face a series of pockets 46 similar to the pockets 35 to receive a series of springs 47 which abut against the face 48 of the piece of equipment 34 in which the stuffing box 33 is formed.

The non-rotatable packing ring 42 has a slot 49 therein to receive a peg 50 secured in the wall 48 whereby to prevent the ring 42 from rotating.

It will be noted that the internal diameters of the rotatable and non-rotatable packing rings 37 and 42 are a little greater than the external diameter of the shaft to provide a clearance between the shaft and the rings 37 and 42.

The clamping ring 11, the rotatable packing ring 37 and the non-rotatable packing ring 42 may each be formed in one piece but they are preferably each formed in two halves secured together by pairs of bolts 51, 52, 53 respectively so that the packing can be dismantled without drawing the rings over the end of the shaft in which case the abutting end faces of the halves of the rings 37 and 42 are arranged to come into sealing engagement with one another whereas the adjacent end faces of the clamping ring 11 will when the ring 11 is clamped on the shaft 32 remain slightly spaced apart.

The mode of operation of the packing shown in FIG. 3 is similar in principle to that of FIGS. 1 and 2. If the external fluid pressure is atmospheric and the internal fluid pressure above atmospheric, the internal pressure will press the non-rotatable packing ring 42 axially towards the rotatable packing 37 to keep the sealing faces 9, 10 in sealing engagement with one another. As the internal pressure increases the packing rings 37, 42 will move to the left to compress the springs 36 and relieve the springs 47 until the ring 37 comes into abutment with the clamping ring 11. Since the force exerted by the internal pressure on the packing rings 37, 42 tending to keep the sealing faces 9, 10 in engagement will be substantially proportional to the internal pressure itself and therefore substantially proportional to the sealing demand, the springs 36, 47 may be designed to exert only a light pressure on the rings 37, 42.

If a negative pressure exists in the stuffing box 33 then the atmospheric pressure on the lefthand end 37a of the rotatable packing ring 37 will move the rings 37, 42 to the right until the ring 42 comes into abutment with the wall 48. Thus the packing of FIG. 3 can maintain a seal under either pressure or vacuum even though light springs are fitted.

Although two sets of springs, 36 and 47 are shown in FIG. 3 the packings may be made with only one set of springs either 36 or 47 and only one set of pockets 35 or 46.

With the arrangement as shown in FIG. 3 the springs 47 virtually become ineffective when the pressure within the stuffing box is negative and when the non-rotatable packing ring 42 comes into engagement with the wall 48. If the springs 36 have only a low degree of extensibility so that the axial movement of the ring 37 is sufficient to allow them fully to extend then the springs 36 may also become ineffective under the conditions mentioned immediately above.

Under conditions of positive fluid pressure within the stuffing box 33 the springs 36 become virtually ineffective when the ring 37 comes into abutment with the clamping ring 11 and if the springs 47 have a low degree of extensibility so as to be completely extended when the ring 37 comes into engagement with the ring 11 then the springs 47 may also become ineffective when the packing is under a positive internal pressure.

If the packing is made without the springs 47 then the springs 36 would only become ineffective under conditions of a sufficient positive internal pressure within the packing whereas if the packing is made without the springs 36 then the springs 47 would only become ineffective under conditions of sufficient negative pressure within the stuffing box 33 or under conditions of a sufficient excess of external pressure.

It is intended that the adjacent faces of the clamping ring 11 and the rotatable packing ring 37 should not be capable of coming into sealing engagement with one another when in abutment but that it will be possible for atmospheric pressure to be present between the faces at all times. As one means of preventing such sealing engagement, a small boss or axial projection 54 is shown as being formed at the inner periphery of the righthand face of the clamping ring 11. Likewise it is intended that the righthand end face of the ring 42 should not come into sealing engagement with the inner end of the stuffing box 33 and if desired the righthand end wall of the ring 42 may be slightly dished to ensure that the pressure between the ring 42 and shaft 32 will always prevail between the end of the ring 42 and the inner end of the stuffing box.

Figure 4:
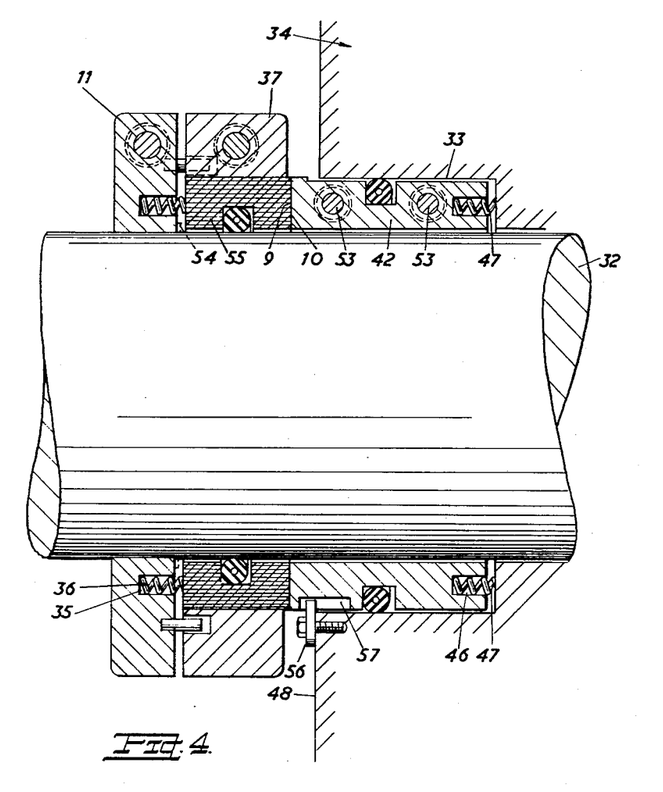
FIG. 4 illustrates a second form of stuffing box packing.

The packing shown in FIG. 4 is substantially similar to that of FIG. 3 and like reference numerals indicate like parts. In this case the non-rotatable packing ring 42 enters to a greater extent into the stuffing box 33 and the springs 47 abut against the inner end of the stuffing box. The halves of the ring 42 are secured together by two pairs of bolts 53 instead of one pair as in FIG. 3. The rotatable packing ring 37 is formed with an internal carbon ring 55 whose end face 9 engages the sealing face 10 of the ring 42. A peg 56 secured to the wall 48 of the piece of equipment 34 engages in a short slot 57 in the non-rotatable packing ring 42 to prevent the ring 42 from rotating.

The packing shown in FIG. 4 may be fitted with only one set of springs 36 or 47 and made with only one set of pockets 35 or 46. The rings 11, 37 and 42 may each be made in one piece instead of in halves.

Figure 5:
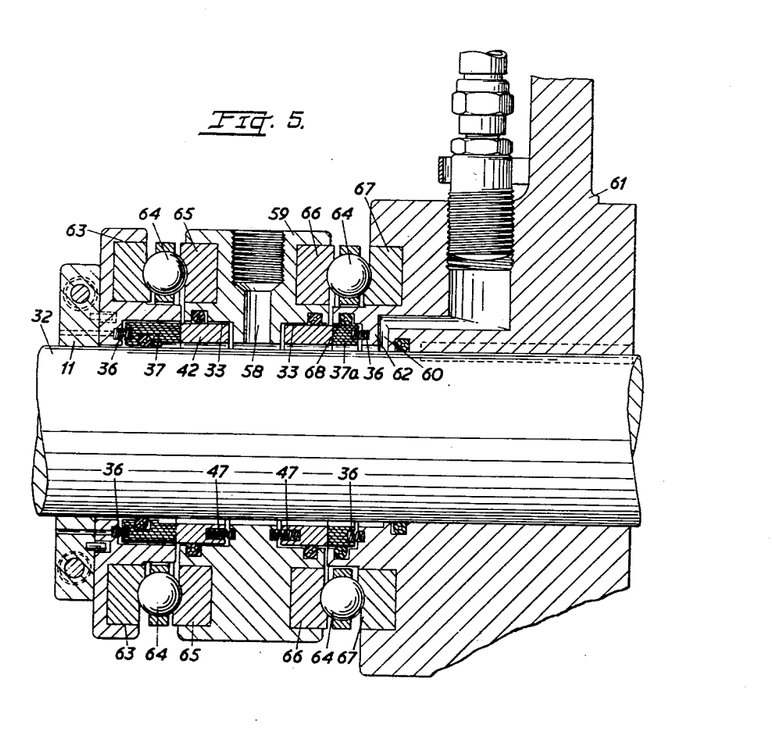
FIG. 5 is a sectional view illustrating a packing designed for operation with an external pressure in the region of the clamping ring greater than atmospheric and adapted to seal the lower end of a marine propeller shaft.

The embodiment illustrated in FIG. 5 is adapted for sealing the after end of a marine propeller shaft relatively to the stern tube of a vessel. Apart from the means by which the packing is mounted on the after bush of the stern tube, which bush acts as a bearing for the shaft 101 carrying a propeller 102, the only major difference between this embodiment and that illustrated in FIG. 2 lies in the ratio between the area of interengagement of the sealing faces 9 and 10 and the effective cross-sectional area of the resilient sealing ring 15. The reason for the comparatively large value of this ratio is the fact that the packing is submerged when in operation and is hence subjected to a surrounding pressure in the region of the clamping ring which exceeds atmospheric by an amount corresponding to the head of water above the packing. Thus there is a comparatively high pressure urging the resilient ring 15 to the right, and a correspondingly lower pressure difference across the sealing faces than would be the case if the packing were working under atmospheric external conditions. As this pressure difference is less a lower force urging the faces into engagement will suffice to maintain a seal than would be the case at atmospheric external pressure. If the ratio were kept at or about unity the force would be so enhanced as to produce correspondingly rapid wear of the faces 9 and 10. By increasing the ratio, to a value dependent upon the range of depths over which the packing is intended to work, a packing may be produced which will provide a sealing pressure never greatly in excess of that actually required for sealing and hence provide a correspondingly low rate of wear of the sealing faces. The embodiment shown has a non-rotatable packing ring 2 provided with a mounting flange which is bolted-on by a ring of cap-screws or bolts such as 103 passing through bores in an outer radial flange 104 of the after bush 100 and threaded into the after end of the stern tube 105. An annular sealing gasket 110 is provided between the packing ring 2 and the after bush 100. The stern tube is clamped to a ship's hull in a conventional manner by means of a stern tube nut 106 carrying a rope guard 107 which protects the section of the propeller shaft adjacent the propeller from fouling by ropes, hawsers and the like.

Figure 6:
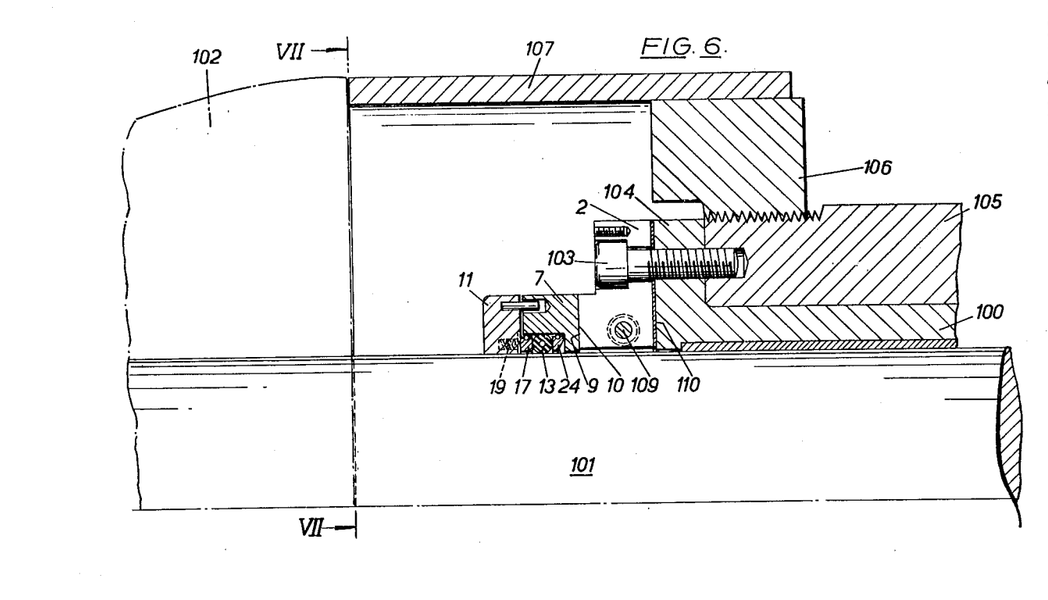
FIG. 6 is a sectional view along the line VII—VII of FIG. 5.

FIG. 6 illustrates how the clamping ring 11 and non-rotatable packing ring 2 may be split in halves and clamped by means of sunk cap-screws such as 108 and 109 respectively. The rotatable packing ring 7 is similarly split and thus the whole packing may be assembled around the propeller shaft when the latter is in position with its propeller attached.

The after propeller shaft bush 100 is intended to be pressure lubricated, the lubricant being maintained at a pressure exceeding the external pressure in the region of the clamping ring. Should the oil pressure fail the ability of the packing to provide a seal irrespective of the direction of the pressure difference across the packing will prevent ingress of water into the stern tube. In many cases vessels are designed to work without pressure lubrication and the ability of the packing to maintain a seal in either direction results in a design of packing which may be applied to many types of vessels, including submarines where the external water pressure against which the stern tube has to be sealed varies over very wide limits.

In one adaptation of packings according to the present invention in which a stern tube packing was designed to work at a normal depth of 9 feet of water with an internal lubricant-pressure of 10 lbs. per square inch, satisfactory operation of the packing was obtained with the area of interengagement of the rotatable and non-rotatable packing rings approximately three times as great as the effective cross-sectional area of the axially displaceable ring. In general it will be found convenient to retain this ratio between the areas in packings designed for all types of vessel, the lubricant pressure being adjusted to suit. In this case, the lubricant pressure should preferably be set at a value which will just fail to produce parting of the sealing faces at the smallest depth at which the packing will have to work. When the packing is working at a greater depth than this, as it normally will be, the lubricant pressure will then be at a value to produce the least wear on the sealing faces.

Figure 7:
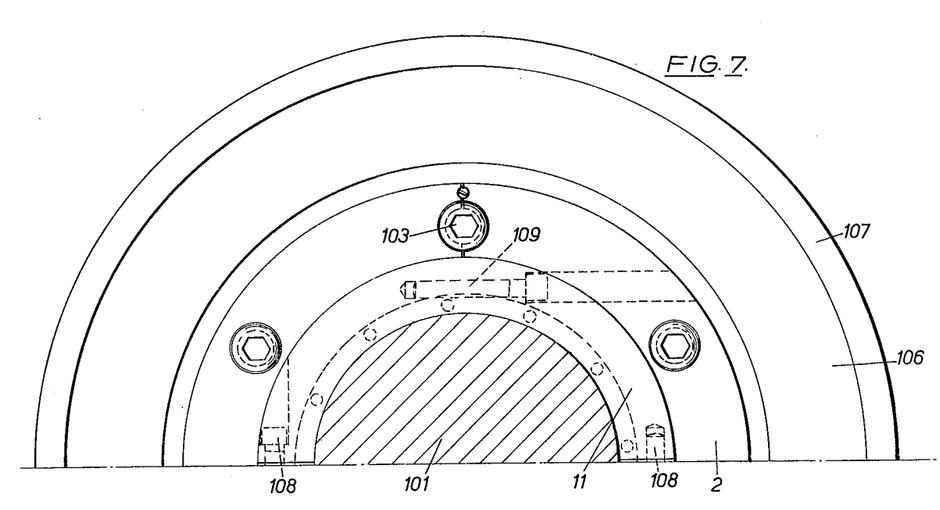
FIG. 7 is a sectional view illustrating a further form of stuffing box packing.

The stuffing box packing illustrated in FIG. 7 utilizes the form of clamping ring 11, rotatable packing ring 7 and associated rotatable parts illustrated in FIG. 2 in combination with the form of non-rotatable packing ring 42 and associated non-rotatable parts illustrated in FIG. 4. The reference numerals of FIGS. 2 and 4 have been applied to corresponding parts of FIG. 7. This form of construction allows the resilient sealing ring 15, under conditions of positive internal pressure, to be axially displaced relatively to the rotatable packing ring which is itself bodily displaceable with the non-rotatable packing ring.

Figure 8:
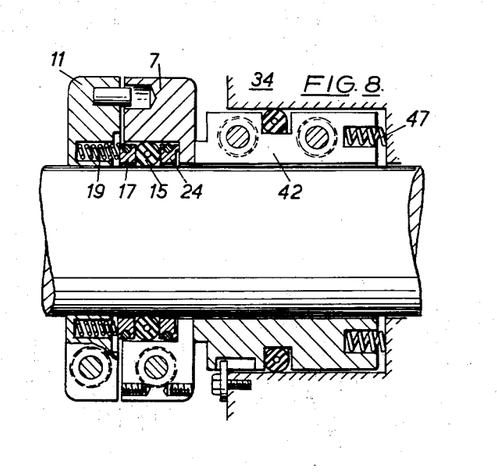
FIG. 8 is a sectional view illustrating a further form of packing.

In the form of construction of FIG. 8, a ring 112c of a clamping ring 111 is formed as a separate spacing ring and is in the form of a diametrically split stepped ring held together by a garter spring 160 and having on one face an annular recess 161. The bore of the ring 112c is larger than the diameter of the shaft 201 and the clamping ring 111 is split diametrically and when the two halves are clamped together, a clearance is left therebetween so that the pressure prevailing in the region of the clamping ring can permeate into the annular recess 161 and thence through the annular space between the ring 112c and the shaft 201 to act on one side of a resilient sealing ring 115a, the other side of which abuts a follower ring 117.

A rotatable packing ring 207 has formed therein a number of axially extending recesses 162 to receive a number of pins 163 projecting from the clamping ring 111 to enable the clamping ring 111 to drive the rotatable packing ring 207 rotationally while leaving the rotatable packing ring 207 free to move axially. It is possible for these pins 163 to be omitted and for the rotatable packing to be driven frictionally by the shaft through the resilient sealing ring 115a.

By constructing the sealing ring 115a of rubber or like resilient material and by constructing the spacing ring 112c and the follower ring 117 with an outside diameter a little less than the inside diameter of a counterbore 208, allowance may be made for a small degree of misalignment between the shaft 201 and the wall 202 of the casing.

Preferably at least the clamping ring 111, rotatable packing ring 207, the follower ring 117, and the spacing ring 112c are split diametrically to facilitate assembly around a shaft, the halves of each part being held together on assembly by means such as bolts. Likewise, the follower ring 117 may be split diametrically and the halves held together by a garter spring.

In a similar manner other parts including the non-rotatable packing ring 203 and the retaining ring 205 are also preferably split diametrically so that the entire packing can be assembled around a shaft already in situ and so that ready access to all partss may be obtained such as for inspection purposes.

In FIG. 8, oil ways are shown at 142. Lubricating ducts leading to the faces 209, 210 are indicated by the reference number 142.

I claim:

1. A packing for a rotatable shaft or the like, comprising a casing, a rotatable packing ring, and a non-rotatable packing ring all surrounding said shaft, means coupling said non-rotatable packing ring to said casing to maintain said non-rotatable packing ring against rotation with said shaft, means coupling said rotatable packing ring to said shaft, for rotation with said shaft, said rotatable packing ring and said non-rotatable packing ring each having an annular sealing face and said faces being in face-to-face sealing engagement with each other, a resilient sealing ring surrounding said shaft and blocking passage of fluid from one side of said packing to the other side of said packing and being shiftable axially of said shaft, a first surface and a second surface each facing away from an annular sealing face and being exposed respectively to the fluid pressures existing at the two sides of said packing, a first means located between said first surface and the annular sealing face from which said first surface faces away to transmit pressure exerted on said first surface to the annular sealing face from which said first surface faces away to urge said annular sealing faces into sealing engagement with each other, a second means located between said second surface and the annular sealing face from which said second surface faces away to transmit pressure exerted on said second surface to the annular sealing face from which said second surface faces away to urge said annular sealing faces into sealing engagement with each other, and spring means positioned to exert force on at least one of said packing rings in a direction and in an amount sufficient to maintain said annular sealing faces in sealing engagement when the fluid pressure existing at one side of said packing is substantially equal to the fluid pressure existing at the other side of said packing, the force exerted by said spring means being predetermined to be insufficient by itself to maintain said annular sealing faces in sealing engagement when the absolute pressure existing at one side of said packing is one atmosphere and the absolute pressure existing at the other side of said packing is substantially zero, said first and second surfaces being located with respect to each other and to said annular sealing faces and having a predetermined area relation to said annular sealing faces so that, of the pressure exerted on one of said surfaces and the pressure exerted on the other of said surfaces, the greater absolute pressure urges said annular sealing faces into sealing engagement with each other irrespective of which pressure is greater, said greater absolute pressure being sufficient, irrespective of the force exerted by said spring means, to maintain said annular sealing faces in sealing engagement.

2. A packing for a rotatable shaft or the like comprising a casing, a rotatable packing ring, a non-rotatable packing ring, and a resilient sealing ring all surrounding said shaft, means coupling said non-rotatable packing ring to said casing to maintain said non-rotatable packing ring against rotation with said shaft, means coupling said rotatable packing ring to said shaft for rotation with said shaft, said rotatable packing ring and said non-rotatable packing ring each having an annular sealing face and said faces being in face-to-face sealing engagement with each other, said resilient sealing ring being shiftable axially of said shaft and blocking passage of fluid from one side of said packing to the other side of said packing, a first surface on one of said packing rings and a second surface on one of said other rings each facing away from an annular sealing face and being exposed respectively to the fluid pressures existing at the two sides of said packing, a first means located between said first surface and the annular sealing face from which said first surface faces away to transmit pressure exerted on said first surface to the annular sealing face from which said first surface faces away to urge said annular sealing faces into sealing engagement with each other, a second means located between said second surface and the annular sealing face from which said second surface faces away to transmit pressure exerted on said second surface to the annular sealing face from which said second surface faces away to urge said annular sealing faces into sealing engagement with each other, and spring means positioned to exert force on at least one of said packing rings in a direction and in an amount sufficient to maintain said annular sealing faces in sealing engagement when the fluid pressure existing at one side of said packing is substantially equal to the fluid pressure existing at the other side of said packing, the force exerted by said spring means being predetermined to be insufficient by itself to maintain said annular sealing faces in sealing engagement when the absolute pressure existing at one side of said packing is one atmosphere and the absolute pressure existing at the other side of said packing is substantially zero, said first and second surfaces being located with respect to each other and to said annular sealing faces and having a predetermined area relation to said annular sealing faces so that, of the pressure exerted on one of said surfaces and the pressure exerted on the other of said surfaces, the greater absolute pressure urges said annular sealing faces into sealing engagement with each other irrespective of which pressure is greater, said greater absolute pressure being sufficient, irrespective of the force exerted by said spring means, to maintain said annular sealing faces in sealing engagement.

3. A packing according to claim 2, wherein said first pressure exposed surface is on said rotatable packing ring, said second pressure exposed surface is on said resilient sealing ring, and both surfaces face away from the annular sealing face on said rotatable packing ring.

4. A packing for a rotatable shaft or the like comprising a casing, a rotatable packing ring, and a non-rotatable packing ring, all surrounding said shaft, means coupling said non-rotatable packing ring to said casing to maintain said non-rotatable packing ring against rotation with said shaft, means coupling said rotatable packing ring to said shaft for rotation with said shaft, said rotatable packing ring and said non-rotatable packing ring each having an annular sealing face and said faces being in face-to-face sealing engagement with each other, said rotatable packing ring defining an annular recess surrounding said shaft and having a concave wall substantially concentric with said shaft and an end wall facing away from the annular sealing face on said rotatable packing ring, said end wall being exposed to fluid pressure existing within said packing, a resilient sealing ring located in said annular recess and engaging said concave wall and said shaft to block passage of fluid from the interior of said packing to the exterior of said packing and vice versa, said sealing ring being shiftable in said annular recess axially of said shaft and having a surface facing away from the annular sealing face on said rotatable packing ring and exposed to the fluid pressure existing at the exterior of said packing, and spring means located between said resilient sealing ring and said recess end wall and exerting force on said end wall in a direction and in an amount sufficient to maintain said annular sealing faces in sealing engagement when the fluid pressure existing in the interior of said packing is substantially equal to the fluid pressure existing at the exterior of said packing, the force exerted by said spring means being predetermined to be insufficient by itself to maintain said annular sealing faces in sealing engagement when the absolute pressure existing in the interior of said packing is one atmosphere and the absolute pressure existing at the exterior of said packing is substantially zero and vice versa, said pressure exposed resilient sealing ring surface and said recess end wall having a predetermined area relation to said annular sealing faces so that, of the pressure exerted on said recess end wall and the pressure exerted on said exposed sealing ring surface, the greater absolute pressure urges said annular sealing faces into sealing engagement with each other irrespective of which pressure is greater, and said greater absolute pressure being sufficient, irrespective of the force exerted by said spring means, to maintain said annular sealing faces in sealing engagement.

5. A packing for a rotatable shaft or the like comprising a casing, a rotatable packing ring, and a non-rotatable packing ring all surrounding said shaft, means coupling said non-rotatable packing ring to said casing to maintain said non-rotatable packing ring against rotation with said shaft, a coupling ring fixed to said shaft, means carried by said coupling ring engaging said rotatable packing ring to couple said rotatable packing ring to said coupling ring so that said rotatable packing ring rotates with said shaft, said rotatable packing ring and said non-rotatable packing ring each having an annular sealing face and said faces being in face-to-face sealing engagement with each other, said rotatable packing ring defining an annular recess surrounding said shaft and having a concave wall substantially concentric with said shaft and an end wall facing away from the annular sealing face on said rotatable packing ring, said recess end wall being exposed to fluid pressure existing in the interior of said packing, a resilient sealing ring located in said annular recess and engaging said concave wall and said shaft, said sealing ring surrounding said shaft and being shiftable in said annular recess axially of said shaft while maintaining sealing contact with said concave wall and said shaft to block passage of fluid from the interior of said packing to the exterior of said packing and vice versa, said resilient sealing ring having a surface facing away from the annular sealing face on said rotatable packing ring and exposed to the fluid pressure existing at the exterior of said packing, and spring means located between said coupling ring and said resilient sealing ring and exerting force on said rotatable packing ring in a direction and in an amount sufficient to maintain said annular sealing faces in sealing engagement when the fluid pressure existing in the interior of said packing is substantially equal to the fluid pressure existing at the exterior of said packing, the force exerted by said spring means being predetermined to be insufficient by itself to maintain said annular sealing faces in sealing engagement when the absolute pressure existing at the interior of said packing is one atmosphere and the absolute pressure existing at the exterior of said packing is substantially zero and vice versa, said pressure exposed resilient sealing ring surface and said recess end wall having a predetermined area relation to said annular sealing faces so that, of the pressure exerted on said end wall and the pressure exerted on said sealing ring surface, the greater absolute pressure urges said annular sealing faces into sealing engagement with each other irrespective of which pressure is greater, and said greater absolute pressure being sufficient, irrespective of the force exerted by spring means, to maintain said annular sealing faces in sealing engagement.

6. A packing according to claim 5, including a second spring means located in said annular recess between said resilient sealing ring and said annular recess end wall, the force of said first-named spring means and said second-named spring means being exerted on said rotatable packing ring in a direction and in an amount sufficient to maintain said annular sealing faces in sealing engagement when the fluid pressure existing in the interior of said packing is substantially equal to the fluid pressure existing at the exterior of said packing, and the force exerted by said first-named spring means and said second-named spring means being predetermined to be insufficient by itself to maintain said annular sealing faces in sealing engagement when the pressure existing in the interior of said packing is one atmosphere and the pressure existing at the exterior of said packing is substantially zero and vice versa.

7. A packing for a rotatable shaft or the like comprising a casing, a rotatable packing ring, a non-rotatable packing ring, and two resilient sealing rings all surrounding said shaft, means coupling said non-rotatable packing ring to said casing to maintain said non-rotatable packing ring against rotation with said shaft, means coupling said rotatable packing ring to said shaft for rotation with said shaft, both of said coupling means permitting said rotatable packing ring and said non-rotatable packing ring to move together relative to said shaft, said rotatable packing ring and said non-rotatable packing ring each having an annular sealing face and said faces being in face-to-face sealing engagement with one another, said resilient sealing rings being shiftable axially of said shaft and respectively sealing said rotatable packing ring to said shaft and said non-rotatable packing ring to said casing to block passage of fluid from one side of said packing to the other side of said packing, said rotatable and non-rotatable packing rings each having a surface facing away from their respective annular sealing faces, said facing away surfaces being exposed respectively to the fluid pressures existing at the two sides of said packing, and spring means positioned to exert force on at least one of said packing rings in a direction and in an amount sufficient to maintain said annular sealing faces in sealing engagement when the fluid pressure existing at one side of said packing is substantially equal to the fluid pressure existing at the other side of said packing, the force exerted by said spring means being predetermined to be insufficient by itself to maintain said annular sealing faces in sealing engagement when the absolute pressure existing at one side of said packing is one atmosphere and the absolute pressure existing at the other side of said packing is substantially zero, said facing away surfaces on said packing rings being located with respect to each other and with respect to said annular sealing faces and having a predetermined area relation to said annular sealing faces so that, of the pressure exerted on one of said packing ring surfaces and the pressure exerted on the other of said packing ring surfaces, the greater absolute pressure urges said annular sealing faces into sealing engagement with each other irrespective of which pressure is greater, and the greater absolute pressure being sufficient, irrespective of the force exerted by said spring means, to maintain said annular sealing faces in sealing engagement.

8. A packing according to claim 7, wherein said means coupling said rotatable packing ring to said shaft includes a coupling ring fixed to said shaft for rotation with said shaft, and said spring means is located between said coupling ring and said rotatable packing ring and is positioned to exert force on said rotatable packing ring.

9. A packing according to claim 7, wherein said spring means is located between said casing and said non-rotatable packing ring and is positioned to exert force on said non-rotatable packing ring.

10. A packing according to claim 8, including a second spring means located between said casing and said non-rotatable packing ring and positioned to exert force on said non-rotatable packing ring, the force exerted by said first-named spring means and said second-named spring means being sufficient to maintain said annular sealing faces in sealing engagement when the fluid pressure existing in the interior of said packing is substantially equal to the fluid pressure existing at the exterior of said packing, and the force exerted by said first-named spring means and said second-named spring means being predetermined to be insufficient by itself to maintain said annular sealing faces in sealing engagement when the absolute pressure existing in the interior of said packing is one atmosphere and the absolute pressure existing at the exterior of said packing is substantially zero and vice versa.

References Cited in the file of this patent

UNITED STATES PATENTS

| | | |
|---|---|---|
| 2,297,302 | Hornschuch | Sept. 29, 1942 |
| 2,305,725 | Meyer | Dec. 22, 1942 |
| 2,362,436 | Stratford | Nov. 7, 1944 |
| 2,395,705 | Wool | Feb. 26, 1946 |
| 2,434,458 | Curry | Jan. 13, 1948 |
| 2,479,265 | Roshong | Aug. 16, 1949 |
| 2,479,711 | Aruthnoff | Aug. 23, 1949 |
| 2,550,667 | Blam | May 1, 1951 |
| 2,650,842 | Coopman | Sept. 1, 1953 |

UNITED STATES PATENT OFFICE
CERTIFICATE OF CORRECTION

Patent No. 3,006,667                          October 31, 1961

James Stephens

It is hereby certified that error appears in the above numbered patent requiring correction and that the said Letters Patent should read as corrected below.

In the grant, lines 1 to 3, for "assignor to United States Metallic Packing Company Limited, of Bradford, Yorkshire, England, a British company," read -- assignor of one-half to United States Metallic Packing Company Limited, of Bradford, Yorkshire, England, a British company, --; lines 12 and 13, for "United States Metallic Packing Company Limited, its successors" read -- James Stephens, his heirs or assigns, and United States Metallic Packing Company Limited, its successors --; in the heading to the printed specification, lines 3 to 5, for "assignor to United States Metallic Packing Company Limited, Bradford, Yorkshire, England, a British company" read -- assignor of one-half to United States Metallic Packing Company Limited, Bradford Yorkshore, England, a British company --.

Signed and sealed this 4th day of September 1962.

(SEAL)
Attest:

ERNEST W. SWIDER

Attesting Officer

DAVID L. LADD

Commissioner of Patents